US012616980B2

(12) United States Patent　(10) Patent No.: US 12,616,980 B2

Schulz et al.　(45) Date of Patent:　May 5, 2026

(54) MAGNETIC ASSISTED SEPARATION APPARATUSES AND RELATED METHODS

(71) Applicant: AMGEN INC., Thousand Oaks, CA (US)

(72) Inventors: Craig Michael Schulz, Thousand Oaks, CA (US); Justin James Provchy, Simi Valley, CA (US); John Kasajja Kawooya, Moorpark, CA (US)

(73) Assignee: AMGEN INC., Thousand Oaks, CA (US)

( * ) Notice: Subject to any disclaimer, the term of this patent is extended or adjusted under 35 U.S.C. 154(b) by 437 days.

(21) Appl. No.: 17/876,016

(22) Filed: Jul. 28, 2022

(65) Prior Publication Data

US 2022/0362783 A1　Nov. 17, 2022

Related U.S. Application Data

(62) Division of application No. 16/018,923, filed on Jun. 26, 2018, now Pat. No. 11,433,402.

(Continued)

(51) Int. Cl.
B03C 1/28　(2006.01)
B01L 9/06　(2006.01)
(Continued)

(52) U.S. Cl.
CPC ................ B03C 1/288 (2013.01); B01L 9/06 (2013.01); B03C 1/01 (2013.01); B03C 1/0332 (2013.01);
(Continued)

(58) Field of Classification Search
None
See application file for complete search history.

(56) References Cited

U.S. PATENT DOCUMENTS

| 5,443,791 A | 8/1995 | Cathcart et al. |
| 5,779,892 A | 7/1998 | Miltenyi et al. |

(Continued)

FOREIGN PATENT DOCUMENTS

| CA | 2219442 C | 7/2007 |
| CN | 1506460 A | 6/2004 |

(Continued)

OTHER PUBLICATIONS

Genscript, "Protein A, G and A/G MagBeads," http://www.protein-purification.com/174.html, retrieved from the internet on Oct. 3, 2018.

(Continued)

*Primary Examiner* — Matthew D Krcha
*Assistant Examiner* — Brittany I Fisher
(74) *Attorney, Agent, or Firm* — MARSHALL, GERSTEIN & BORUN LLP

(57)　ABSTRACT

Magnetic assisted separation apparatuses for separating a target substance from a medium in which the target substance is suspended, and related methods, are provided. According to one aspect, a magnetic separator may include a frame having an opening configured to receive one or more containers containing the medium. Additionally, the magnetic separator may include first and second magnetic field generating elements mounted on opposing sides of the frame such that one or more containers can be positioned between the first and second magnetic field generating elements. According to another aspect, a workstation includes a work surface for receiving one or more containers containing the medium, a fluid transfer member, an automated manipulator configured to move the fluid transfer member, and a plurality magnetic field generating elements each being moveable between a position remote from the one or more containers and another position adjacent to the one or more containers.

20 Claims, 9 Drawing Sheets

Related U.S. Application Data

(60) Provisional application No. 62/534,563, filed on Jul. 19, 2017.

(51) Int. Cl.

| | |
|---|---|
| B03C 1/01 | (2006.01) |
| B03C 1/033 | (2006.01) |
| B03C 1/08 | (2006.01) |
| B03C 1/30 | (2006.01) |
| G01N 1/34 | (2006.01) |
| G01N 35/00 | (2006.01) |
| G01N 35/10 | (2006.01) |

(52) U.S. Cl.

CPC ................ B03C 1/30 (2013.01); G01N 1/34 (2013.01); G01N 35/0098 (2013.01); B01L 2200/023 (2013.01); B01L 2200/0668 (2013.01); B03C 2201/18 (2013.01); B03C 2201/26 (2013.01); G01N 35/1065 (2013.01)

(56) References Cited

U.S. PATENT DOCUMENTS

| | | | |
|---|---|---|---|
| 6,569,620 | B1 | 5/2003 | Gold et al. |
| 7,776,580 | B2 | 8/2010 | Zhang et al. |
| 8,276,762 | B2 | 10/2012 | Davis et al. |
| 8,318,500 | B2 | 11/2012 | Ammann et al. |
| 8,323,567 | B2 | 12/2012 | Aoyagi |
| 8,383,039 | B2 | 2/2013 | Zhou et al. |
| 9,874,555 | B2 | 1/2018 | Weidemaier et al. |
| 2001/0055545 | A1 | 12/2001 | Takii et al. |
| 2002/0008053 | A1 | 1/2002 | Hansen et al. |
| 2004/0106145 | A1 | 6/2004 | Gold et al. |
| 2004/0142384 | A1* | 7/2004 | Cohen .................. B03C 1/0335 |
| | | | 435/7.2 |
| 2006/0207944 | A1 | 9/2006 | Siddiqi |
| 2007/0184463 | A1 | 8/2007 | Molho et al. |
| 2010/0009351 | A1 | 1/2010 | Brahmasandra et al. |
| 2011/0031168 | A1 | 2/2011 | Ellis et al. |
| 2011/0306051 | A1 | 12/2011 | Belz et al. |
| 2012/0115213 | A1 | 5/2012 | Hofstadler et al. |
| 2012/0244044 | A1 | 9/2012 | Brassard |
| 2013/0011880 | A1* | 1/2013 | Barbee .............. G01N 35/0099 |
| | | | 422/509 |
| 2013/0209995 | A1 | 8/2013 | Andrulat et al. |
| 2013/0252249 | A1 | 9/2013 | Belz et al. |
| 2014/0353218 | A1* | 12/2014 | Soukka .................. B03C 1/032 |
| | | | 209/214 |
| 2015/0203895 | A1 | 7/2015 | Oster et al. |

FOREIGN PATENT DOCUMENTS

| | | |
|---|---|---|
| CN | 101273258 A | 9/2008 |
| CN | 101368951 A | 2/2009 |
| CN | 201201943 Y | 3/2009 |
| CN | 102427885 A | 4/2012 |
| CN | 203244989 U | 10/2013 |
| CN | 203658373 U | 6/2014 |
| CN | 104094123 A | 10/2014 |
| CN | 104364653 A | 2/2015 |
| CN | 106148184 A | 11/2016 |
| EP | 2333560 A2 | 6/2011 |
| EP | 2618157 A1 | 7/2013 |
| JP | 2006516890 A | 7/2006 |
| JP | 2007101364 A | 4/2007 |
| JP | 2015505372 A | 2/2015 |
| WO | WO-2004/065015 A2 | 5/2004 |
| WO | WO-2015/200210 | 12/2015 |

OTHER PUBLICATIONS

"Preparative Protein Purification by Magnetic Beads," http://www.genscript.com/protein_a_g_and_a_or_g_magbeads.html, retrieved from the Internet on Oct. 3, 2018.

International Application No. PCT/US2018/039681, International Search Report and Written Opinion, dated Nov. 20, 2018.

Chinese Patent Application for Invention No. 201880046680.7, Office Action, dated Jun. 3, 2021.

Written Opinion of the Intellectual Property Office of Singapore issued in application No. 11202000421T, dated May 4, 2021.

First Office Action and Search Report issued in Chinese application No. 201880046680.7, dated Jun. 3, 2021.

European Patent Application No. 21172466.1, Extended European Search Report, dated Sep. 24, 2021.

Japanese Patent Application No. 2019-564463, Notice of Rejection, mailed May 10, 2022.

Australian Examination Report No. 1 issued to application No. 2018304033, dated Jul. 14, 2022.

Notice of Preliminary Rejection issued to Korean Patent Application No. 10-2020-7002820, dated Nov. 25, 2022.

Examination Report issued to Singapore Application No. 11202000421T, Intellectual Property Office of Singapore, dated Oct. 26, 2022.

* cited by examiner

MAGNETIC ASSISTED SEPARATION APPARATUSES AND RELATED METHODS

CROSS-REFERENCE TO RELATED APPLICATION

This is a divisional of U.S. patent application Ser. No. 16/018,923, filed June 26 2018, which claims priority to U.S. Provisional Patent Application No. 62/534,563, filed Jul. 19, 2017, the entire contents of each of which are hereby incorporated by reference herein.

FIELD OF DISCLOSURE

The present disclosure generally relates to separation apparatuses and methods and, more particularly, to separating a target substance such as a biomolecule from a fluid medium in which the target substance is suspended, in order to facilitate downstream processing or analysis of the target substance.

BACKGROUND

Certain diagnostic, research, and drug manufacturing activities benefit from or require the isolation a target substance, such as a protein, contained in a cell culture or other biological mixture. This task has been accomplished through various techniques in the past. Some of these require altering the solubility of the target substance such that it precipitates out of the biological mixture. Certain other techniques require centrifugation, in which particles of different densities are separated by rotating them about a fixed point at high speeds. Still other techniques are based on chromatography, which requires passing the biological mixture through a filtering material in which the constituent components of the biological mixture move at different rates.

Such conventional purification techniques, and others, tend to be time-consuming, labor-intensive, and/or limited to relatively small sample sizes. Centrifugation, for example, is typically carried out in test tubes or bottles, which may limit the volume of material that can be processed at a given time. Also, certain conventional purification techniques may require a laboratory technician to manually pipette fluids between various containers, which can be inefficient and may increase the risk of cross-contamination.

The present disclosure sets forth purification related apparatuses and methods embodying advantageous alternatives to existing purification apparatuses and methods, and that may address one or more of the challenges or needs mentioned herein, as well as provide other benefits and advantages.

SUMMARY

One aspect of the present disclosure provides a magnetic separator for separating or removing a target substance from a medium in which the target substance is suspended. The magnetic separator may include a frame having a first opening configured to receive at the least one container or vessel containing the medium. The magnetic separator may also include a first magnetic field generating element and a second magnetic field generating element. The first and second magnetic field generating elements may be mounted on opposing sides of the frame at a distance from each other such that the at least one container is positionable between the first and second magnetic field generating elements.

Another aspect of the present disclosure provides a purification method which may include: (a) adding a medium in which a target substance is suspended to a container or vessel; (b) adding a plurality magnetic beads to the container, the target substance temporarily binding to the plurality of magnetic beads; and (c) positioning the container between a first magnetic field generating element and a second magnetic field generating element, the first and second magnetic field generating elements being held at a distance from each other by a frame, at least one of the first magnetic field generating element or the second magnetic field generating element magnetically attracting and holding the plurality of magnetic beads against an interior surface of the container.

An additional aspect of the present disclosure provides a workstation for separating a target substance from a medium in which the target substance is suspended. The workstation may include a work surface for receiving at least one container or vessel containing the medium, and a fluid transfer member configured to transfer fluids to and from the at least one container. Additionally, the workstation may include an automated manipulator configured to move the fluid transfer member relative to the work surface. Moreover, the workstation may include a plurality magnetic field generating elements each being moveable relative to the work surface between a first position remote from the at least one container and a second position adjacent to the at least one container.

Yet another aspect of the present disclosure provides a purification method which may include: (a) providing a workstation having a work surface, an automated manipulator moveable relative to the work surface and carrying a fluid transfer member, and a plurality of magnetic field generating elements laterally spaced apart from each other to define a plurality of rows; (b) adding at least one medium in which a target substance is suspended to a plurality of containers or vessels; (c) adding a plurality of magnetic beads to the plurality of containers, the target substance temporarily binding to the plurality of magnetic beads; and (d) arranging the plurality of containers in the plurality of rows defined between the plurality of magnetic field generating elements, such that the plurality of magnetic field generating elements magnetically attract and hold the plurality magnetic beads against an interior surface of a respective container of the plurality of containers.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the embodiments, except as may be explicitly delineated in the corresponding written description. Also, none of the drawings is necessarily drawn to scale.

DETAILED DESCRIPTION

Figure 1:
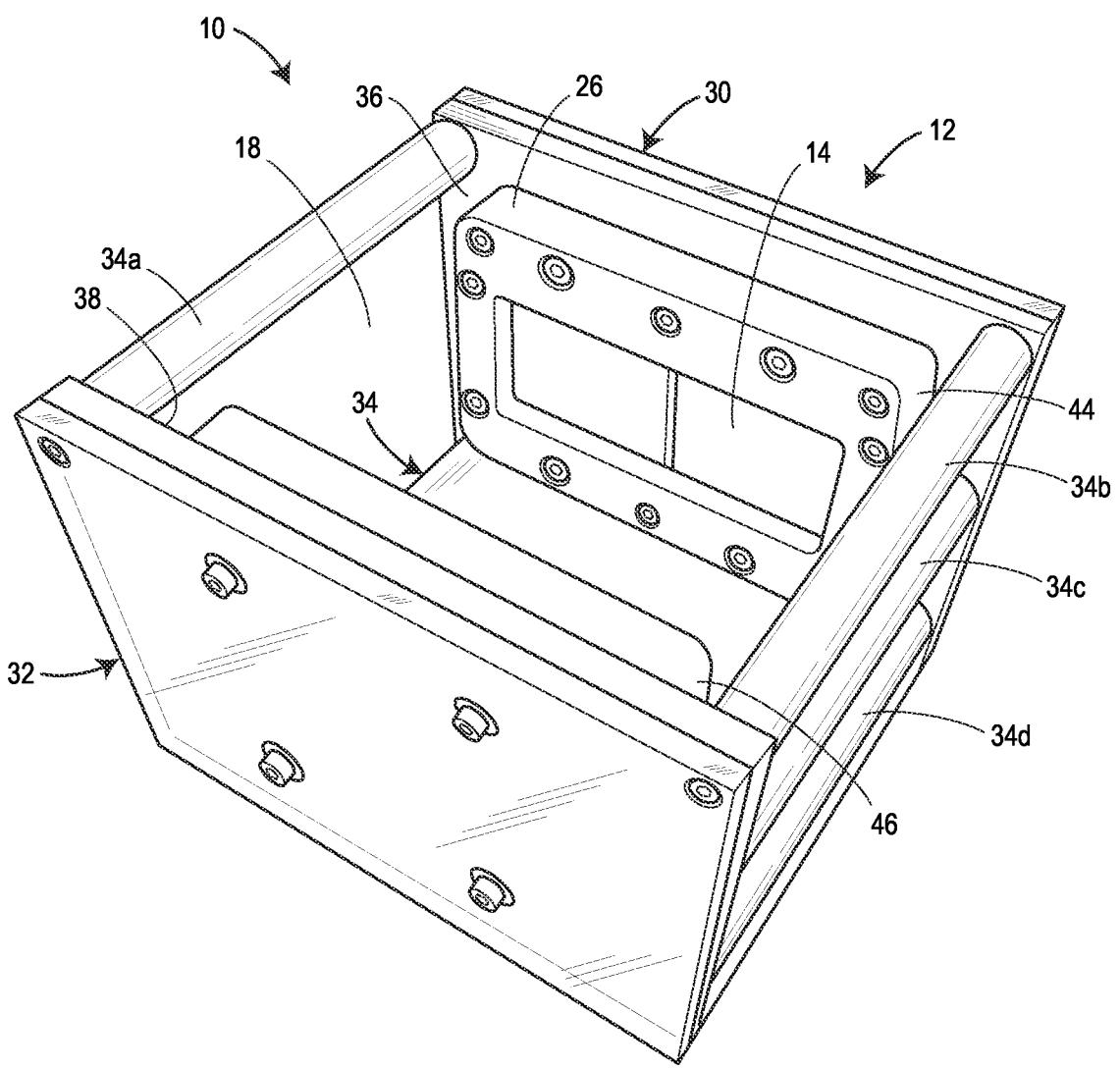
FIG. 1 is a top perspective view of an embodiment of a magnetic separator in accordance with principles of the present disclosure.

The present disclosure generally concerns apparatuses and methods for separating a target substance, such as a protein, from a fluid medium in which the target substance is suspended. In broad terms, the presently disclosed apparatuses and methods involve positioning one or more magnetic field generating elements adjacent to an exterior of one or more containers containing the medium having the target substance. A plurality of magnetic beads may be submerged in the medium and may bind with the target substance. The one or more magnetic field generating elements may magnetically attract the magnetic beads bound with the target substance and immobilize or otherwise hold the magnetic beads statically against an interior surface of the one or more containers. The medium may then be removed from the one or more containers, leaving behind the magnetic beads bound with the target substance. Subsequently, the magnetic beads may be subjected to washing and/or elution procedures to release and/or extract the target substance from the magnetic beads. The magnetic beads may eventually be separated from the magnetic field by simply moving the one or more magnetic field generating elements away from the one or more containers, or vice versa.

So configured, the apparatuses and basic methods of the present disclosure advantageously simplify the process of separating a target substance from a medium and, in certain embodiments, may eliminate or reduce the number of tasks that must be performed manually by a laboratory technician or other user. Furthermore, the presently disclosed apparatuses and methods may provide the ability to process relatively large sample volumes without substantially increasing the footprint of a workstation needed for purification related equipment. Additionally, the purification apparatuses and methods of the present disclosure may reduce the possibility of cross-contamination, which may arise if one or more magnetic field generating elements are submerged in a sample medium.

Each of the foregoing components and related methods will now be described in more detail.

The apparatuses and methods of the present disclosure may be used to separate a wide variety of target substances (e.g., molecules, complexes of molecules, biomolecules, complexes of biomolecules, proteins, protein complexes, peptides, nucleic acid ligands, pathogenic microorganisms, cells, etc.) from a wide variety of sample mixtures (e.g., cell cultures, blood, salvia, mucus, perspiration, urine, stool, soil, food products, etc.). Also, a wide variety of magnetic beads may be used depending on the target substance to be isolated and/or the character of medium in which the target substance is suspended. In some embodiments, the magnetic beads may have a spherical shape and possess a silica-based paramagnetic core that is coated with a material that binds or conjugates to the target substance. The binding action between the magnetic beads and the target substance may be achieved covalently, non-covalently, electrostatically, through hydrogen bonding, through van der Waals forces, and/or through any other suitable molecular binding process. In at least one embodiment, the medium may be a cell culture or other biological mixture, the target substance may be an antibody or other protein, and the magnetic beads may be protein A magnetic beads. In another embodiment, the medium may be a cell culture or other biological mixture, the target substance may be a poly-Histidine-tagged protein, and the magnetic beads may be coated with nickel, zinc, copper, or cobalt.

A non-limiting list of examples of the types of magnetic beads that may be implemented in the presently disclosed purification systems and methods include: affinity type magnetic beads (e.g., Amine magnetic beads, Aldehyde magnetic beads, Carboxy magnetic beads, CDI magnetic beads, DVS magnetic beads, DADPA magnetic beads, Epoxy magnetic beads, Hydrazide magnetic beads, Hydroxy magnetic beads, Iodoacetyl magnetic beads, NHS magnetic beads, Sulfhydryl magnetic beads, Tosyl magnetic beads, Thiol magnetic beads, Silica magnetic beads IDA magnetic beads, etc.); reversed-phase type magnetic beads (e.g., C4 magnetic beads, C8 magnetic beads, C18 magnetic beads, Cyanopropyl magnetic beads, Phenyl magnetic beads, diPhenyl magnetic beads, etc.); ion exchange type magnetic beads (e.g., DEAE Magnetic Beads, PSA Magnetic Beads, SAX Magnetic Beads, WCX Magnetic Beads, SCX Magnetic Beads, Hydroxyapatite Magnetic Beads, etc.); antibody purification type magnetic beads (e.g., Protein A Magnetic Beads, Protein G Magnetic Beads, Protein NG Magnetic Beads, Protein L Magnetic Beads, Quick IgG Pure Magnetic Beads, Antigen Peptide Magnetic Beads, Quick IgM Pure Magnetic Beads, Anti-IgG Magnetic Beads, Quick IgA Pure Magnetic Beads, Thiophillic Magnetic Beads, etc.); antibody immobilization type magnetic beads (e.g., Protein A magnetic beads, Protein G magnetic beads, Protein NG magnetic beads, Protein L magnetic beads, Epoxy-activated magnetic beads, Aldehyde-terminated magnetic beads, Hydrazide-terminated magnetic beads, Carboxyl-terminated magnetic beads, Iodoacetyl-activated magnetic beads, Thiol-activated magnetic beads, etc.); recombinant protein purification type magnetic beads (e.g., Ni+ charged magnetic beads, Co+ charged magnetic beads, Maltose magnetic beads, Calmodulin magnetic beads, etc.); peptide immobilization type magnetic beads (e.g., Epoxy-activated magnetic beads, Aldehyde-terminated magnetic beads, Carboxyl-terminated magnetic beads, Amine-terminated magnetic beads, Iodoacetyl-activated magnetic beads, Thiol-activated magnetic beads, etc.); magnetic beads for DNA or RNA purification; magnetic beads for Endotoxin removal; magnetic beads for abundant protein removal; and/or EDTA magnetic beads.

As used herein, the term "magnetic" is defined to encompass any element that is magnetic, paramagnetic, and/or ferromagnetic. Accordingly, the magnetic beads may be magnetic beads, paramagnetic beads, ferromagnetic beads, or any combination thereof.

In some embodiments, the magnetic beads may have a density that is greater than that of the medium, such that the magnetic beads sink to the bottom of the container holding the medium when the magnetic beads are submerged in the sample mixture. In other embodiments, the magnetic beads may have a density which is less than or equal to the medium such that the magnetic beads float, or partially float, in the medium.

Figure 2:
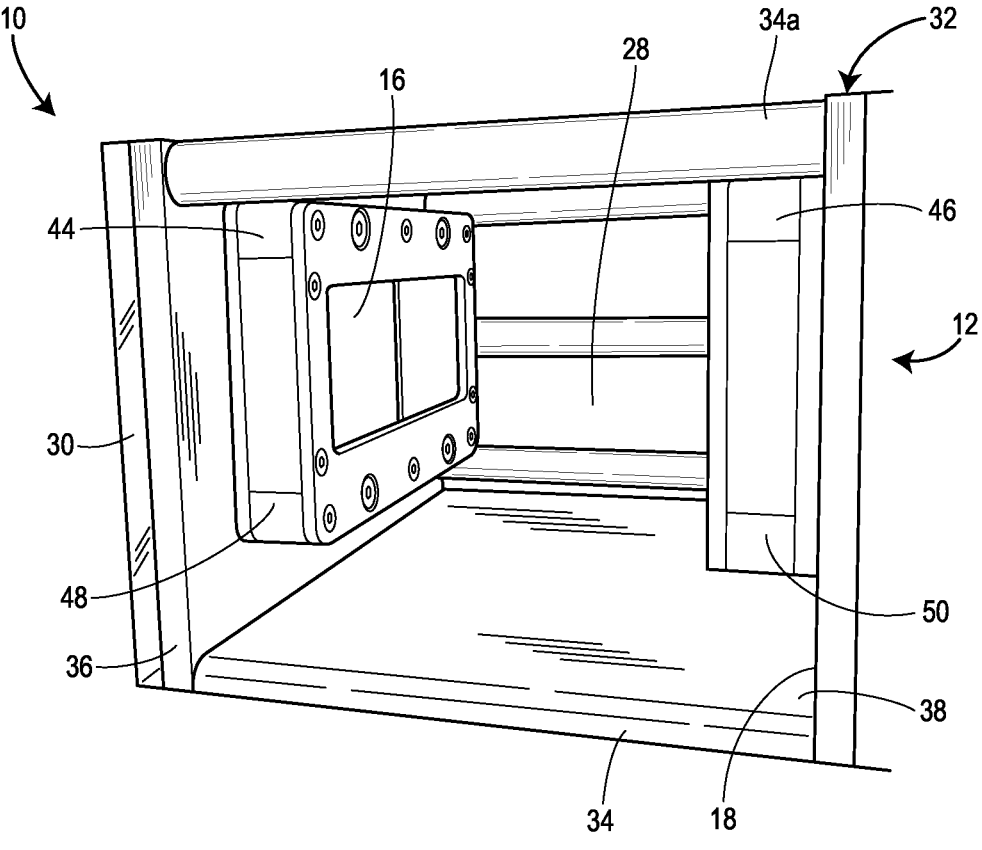
FIG. 2 is a front perspective view of the magnetic separator illustrated in FIG. 1.
Figure 3:
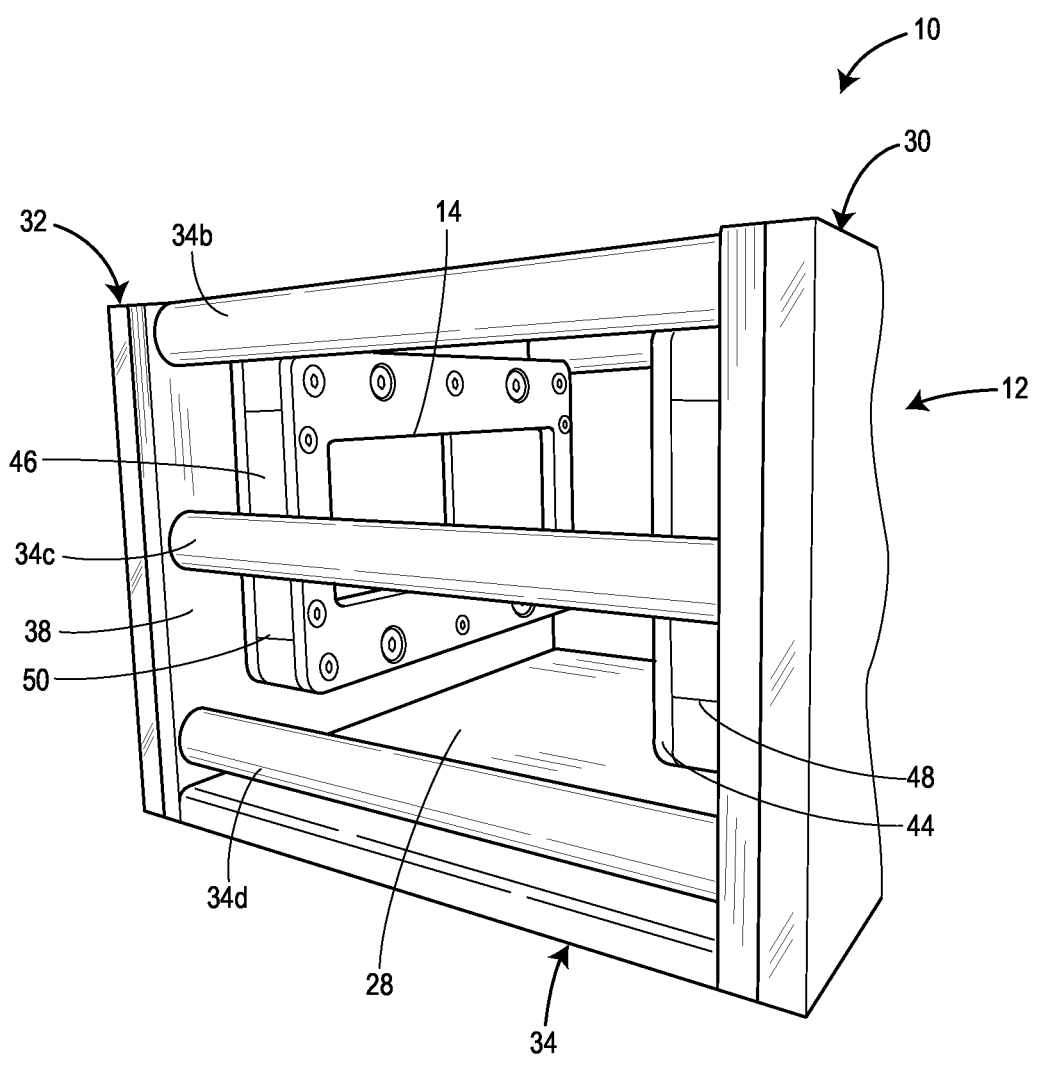
FIG. 3 is a rear perspective view of the magnetic separator depicted in FIG. 1.

FIGS. 1-3 illustrate one embodiment of a magnetic separator 10 in accordance with principles of the present disclosure. The magnetic separator 10 generally includes a frame 12 for mounting magnetic field generating elements 14 and 16 at distance X1 from each other. An opening 18 may be formed in the frame 12 and dimensioned such that the one or more containers 20 can be inserted through the opening 18 into the space between the magnetic field generating elements 14 and 16, as shown in FIG. 3. In certain embodiments, the containers 20 may be attached to or otherwise held by a non-magnetic support rack 50 (see FIG. 4) that is also positioanble between the mounting magnetic field generating elements 14 and 16.

In general, the frame 12 functions to maintain the separation distance X1 between the magnetic field generating elements 14 and 16 despite the magnetically attractive and/or repulsive forces existing among the magnetic field generating elements 14 and 16 and the magnetic beads 40 disposed in the containers 20. With the magnetic field generating elements 14 and 16 fixed at a set distance X1 by the frame 12, the user may not be required to set up or otherwise handle the magnetic field generating elements 14 and 16, which can be cumbersome and potentially unsafe in situations where the magnetic pull force between the magnetic field generating elements 14 and 16 is relatively strong. Also, by not having to come into direct contact with the magnetic field generating elements 14 and 16, there may be less risk of damage to the memories or other sensitive components of instruments or personal electronics carried by the user.

In some embodiments, the lateral distance X1 separating the first and second magnetic field generating elements 14 and 16 may be in a range between approximately (e.g., ±10%) 3-36 inches, or in a range between approximately (e.g., ±10%) 3-24 inches, or in a range between approximately (e.g., ±10%) 3-18 inches, or in a range between approximately (e.g., ±10%) 3-12 inches, or greater than or equal to approximately (e.g., ±10%) 1 inch, or greater than or equal to approximately (e.g., ±10%) 2 inches, or greater than or equal to approximately (e.g., ±10%) 3 inches, or greater than or equal to approximately (e.g., ±10%) 4 inches, or equal to approximately (e.g., ±10%) 3.4 inches.

In the present embodiment, the separation distance X1 between the magnetic field generating elements 14 and 16 is non-adjustable. However, in alternative embodiments, the frame 12 may have an adjustable width, allowing the user to adjust the distance X1 between the magnetic field generating elements 14 and 16 and then lock the magnetic field generating elements 14 and 16 in place.

Referring to FIGS. 1-4, the frame 12 may be constructed by a first vertical sidewall 30, a second vertical sidewall 32, and a horizontal bottom wall 34. The first and second vertical sidewalls 30 and 32 may be arranged parallel to each other as shown in the figures, or, in alternative embodiments, may be arranged at a non-parallel angle relative to each other. The horizontal bottom wall 34 may extend between the first and second vertical sidewalls 30 and 32 and may provide the structural support necessary to keep the first and second vertical sidewall 30 and 32 from moving relative to each other as a result of the magnetically attractive and/or repulsive forces existing among the magnetic field generating elements 14 and 16 and the magnetic beads 40 disposed in the containers 20. Additional structural supports may be provided by one or more beams 34a-d which extend between the first and second vertical sidewalls 30 and 32, as shown in FIGS. 1-3. In alternative embodiments, the bottom wall 34 may be omitted and only the one or more beams 34a-d may be included for keeping the first and second vertical sidewalls 30 and 32 separated. In still further alternative embodiments, the beams 34a-d may be omitted and only the bottom wall 34 may be included for maintaining the separation distance of the first and second vertical sidewalls 30 and 32.

As depicted in FIGS. 1-3, the frame 12 does not include a front wall, a top wall, or a rear wall. Instead of a front wall, the opening 18 (i.e., front opening) is defined between the first and second vertical sidewalls 30 and 32. Similarly, instead of a top wall and a rear wall, a top opening 26 and a rear opening 28, respectively, are defined between the first and second vertical sidewalls 30 and 32. In alternative embodiments, a top wall and/or a rear wall may be included, such that the only openings are the front opening 18 and the rear opening 28, or only the front opening 18 and the top opening 26, or only the front opening 18. In still further alternative embodiments, the top opening 26 may be the only opening formed in the frame 12. In the illustrated embodiment, the front opening 18 is partitioned from the top opening 26 by the beam 34a, and the top opening 26 is partitioned from the rear opening 28 by the beam 34b. In other embodiments, where the beams 34a and the beam 34b are omitted, the front opening 18, top opening 26, and rear opening 28 may be continuous with each other (see, e.g., FIG. 5).

Also, while the vertical sidewalls 30 and 32 and the horizontal bottom wall 34 are illustrated as being solid structures extending continuously along the entire length of the separator 10, in alternative embodiments, one or more of the vertical walls 30 and 32 and/or the horizontal bottom wall 34 may be formed by one or more struts or girders with gaps therebetween, or possess one or more cut-out sections, in order to reduce the weight of the frame 12.

The frame 12 may be constructed of a rigid material including, but not limited to, certain types of metal and/or plastic. The rigidity of the frame 12 should be such that the magnetically attractive and/or repulsive forces existing among the magnetic field generating elements 14 and 16 and the magnetic beads 40 disposed in the containers 20 does not cause the frame 12 to deform. In some embodiments, the frame 12 may be constructed of a non-magnetic material, such as plastic and/or aluminum, for example; whereas, in other embodiments, the frame 12 may be made of a magnetic material such as ferritic stainless steel.

With continued reference to FIGS. 1-4, the first magnetic field generating element 14 may be rigidly secured to an inwardly facing surface 36 of the first vertical sidewall 30, and the second magnetic field generating element 16 may be rigidly secured to an inwardly facing surface 38 of the second vertical sidewall 32. In some embodiments, the first magnetic field generating element 14 and/or the second magnetic field generating element 16 may be rigidly secured with a fastener such as a bolt and/or screw, for example. Furthermore, in some embodiments, each of the first magnetic field generating element 14 and/or the second magnetic field generating element 16 may be housed within a respective cage or other enclosure 44 or 46 that is rigidly secured to the inwardly facing surface 36 of the first vertical sidewall 30 or the inwardly facing surface 38 of the second vertical sidewall 32. Each of the cages 44 and 46 may possess a side opening 48 or 50, allowing the first or second magnetic field generating element 14 or 16 to be slidably inserted or removed from its respective cage 44 or 46.

Each of the magnetic field generating elements 14 and 16 may be mounted such that its downwardly facing or bottom surface is spaced apart in the vertical direction from the horizontal bottom wall 34, or if the horizontal bottom wall 34 is omitted the surface upon which the frame 12 rests, by a distance X2. As discussed below, this may provide room or clearance for lateral sides of a non-magnetic support rack to be inserted beneath, respectively, the first and second magnetic field generating elements 14 and 16.

Figure 4:
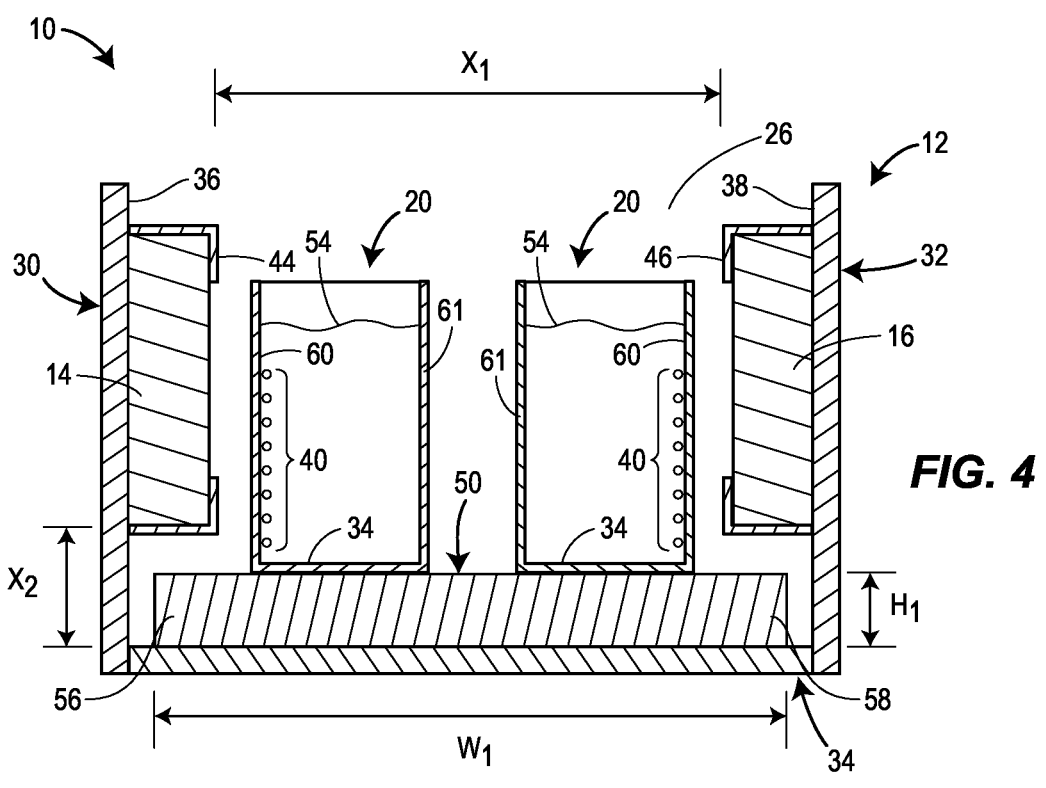
FIG. 4 is a cross-sectional view of the magnetic separator illustrated in FIG. 1, loaded with containers containing a fluid medium and magnetic beads.

As shown in FIG. 4, the first and second magnetic field generating elements 14 and 16 protrude inwardly from, respectively, the inwardly facing surface 36 of the first vertical sidewall 30 and the inwardly facing surface 38 of the second vertical sidewall 32. In alternatively embodiments, the first and second magnetic field generating elements 14 and 16 may be positioned in respective recesses or depressions formed in, respectively, the inwardly facing surface 36 of the first vertical sidewall 30 and the inwardly facing surface 38 of the second vertical sidewall 32. As such, the first and second magnetic field generating elements 14 and 16 may be flush with, respectively, the inwardly facing surfaces 36 and 38.

In some embodiments, the first and second magnetic field generating elements 14 and 16 may have a generally flat or planar shape with a rectangular cross section, as shown in FIG. 4. However, other shapes and cross-sections are also possible. Also, magnetic field generating elements in addition to those depicted in the figures may be included. Furthermore, in some embodiments, only a single magnet field generating element may be included, such that one of the vertical sidewalls 30 or 32 is free of a magnetic field generating element.

In some embodiments, each of the magnetic field generating elements 14 and 16 may be constructed of a respective permanent magnet configured to generate its own persistent magnetic field. Each of the permanent magnets may have a maximum magnetic pull force in range between approximately (e.g., ±10%) 50-1000 Newtons (N), or approximately (e.g., ±10%) 100-800 N, or approximately (e.g., ±10%) 100-700 N, or approximately (e.g., ±10%) 150-600 N, or approximately (e.g., ±10%) 200-500 N, or approximately (e.g., ±10%) 200-450 N, or greater than or equal to approximately (e.g., ±10%) 50 N, or greater than or equal to approximately (e.g., ±10%) 100 N, or greater than or equal to approximately (e.g., ±10%) 150 N, or greater than or equal to approximately (e.g., ±10%) 200 N, or greater than or equal to approximately (e.g., ±10%) 250 N. In some embodiments, the total combined magnetic pull force of the permanents magnets may be greater than or equal to approximately (e.g., ±10%) 500 N, or greater than or equal to approximately (e.g., ±10%) 1000 N, or greater than or equal to approximately (e.g., ±10%) 1500 N, or greater than or equal to approximately (e.g., ±10%) 2000 N, or greater than or equal to approximately (e.g., ±10%) 2500 N. In some embodiments, the permanent magnets constituting the magnetic field generating elements 14 and 16 may be nickel-plated neodymium block magnets. In alternative embodiments, each of the magnetic field generating elements 14 and 16 may constructed of a respective electromagnet configured to generate a magnetic field when supplied with electric current.

With reference to FIG. 4, the magnetic separator 10 may include a non-magnetic support rack 50 which is separate from and moveable relative to the frame 12. In general, the non-magnetic support rack 50 may be configured to hold a plurality of containers 20 containing a medium 54 in which a target substance T is initially suspended. In some embodiments, the non-magnetic support rack 50 may be configured to prevent lateral movement of the containers 20 relative to each other as a result of the magnetically attractive and/or repulsive forces existing among the magnetic field generating elements 14 and 16 and the magnetic beads 40 disposed in the containers 20. This aspect of the non-magnetic support rack 50 may be achieved through various constructions, including, for example: forming the non-magnetic support rack 50 with a plurality of wells each being dimensioned to receive one of the containers 20; or rigidly securing the containers 20 to the non-magnetic support rack 50 with one or more fasteners or an adhesive; or, as shown in the embodiment illustrated in FIG. 5, integrally joining the containers 120 with the support rack 150 such that they form a single, unitary structure. The non-magnetic support rack 50 may be constructed of any non-magnetic material including, for example, plastic or glass, such that it is not magnetically attracted or repulsed by the first and second magnetic field generating elements 14 and 16. The containers 20 also may be constructed of a non-magnetic material, including, for example, glass or plastic.

In some embodiments, the non-magnetic support rack 50 may be configured to hold the containers 20 in one, two, three, or more rows. Furthermore, in some embodiments, each row of the containers 20 formed by the non-magnetic support rack 50 may extend lengthwise in a direction parallel to the first and second vertical sidewalls 30 and 32.

The non-magnetic support rack 50 may have a width or otherwise be dimensioned such that it can be inserted generally in a horizontal direction through the opening 18 in the front side of the frame 12. This insertion may result in the containers 20 being positioned in the space between the first and second magnetic field generating elements 14 and 16. In some embodiments, such as the one shown in FIG. 4, a width W1 of the non-magnetic support rack 50 may be greater than the distance X1 separating the first and second magnetic field generating elements 14 and 16. In such embodiments, a height H1 of the non-magnetic support rack 50 may be less than the vertical distance X2 separating the bottom surfaces of the first and second magnetic field generating elements 14 and 16 from the horizontal bottom wall 34 of the frame 12. Accordingly, first and second lateral ends 56 and 58 of non-magnetic support rack 50 may fit beneath, respectively, the first and second first and second magnetic field generating elements 14 and 16. This configuration may advantageously limit lateral movement of the non-magnetic support rack 50 caused by the inertia of the magnetic beads 40 being magnetically pulled against the interior surface of their respective containers 20 by the magnetic field generating elements 14 and 16. This is because the first and second lateral ends 56 and 58 of non-magnetic support rack 50 may abut against, respectively, the inwardly facing surface 36 of the first vertical sidewall 30 and the inwardly facing surface 38 of the first vertical sidewall 32, thereby preventing significant lateral movement of the non-magnetic support rack 50.

Figure 5:
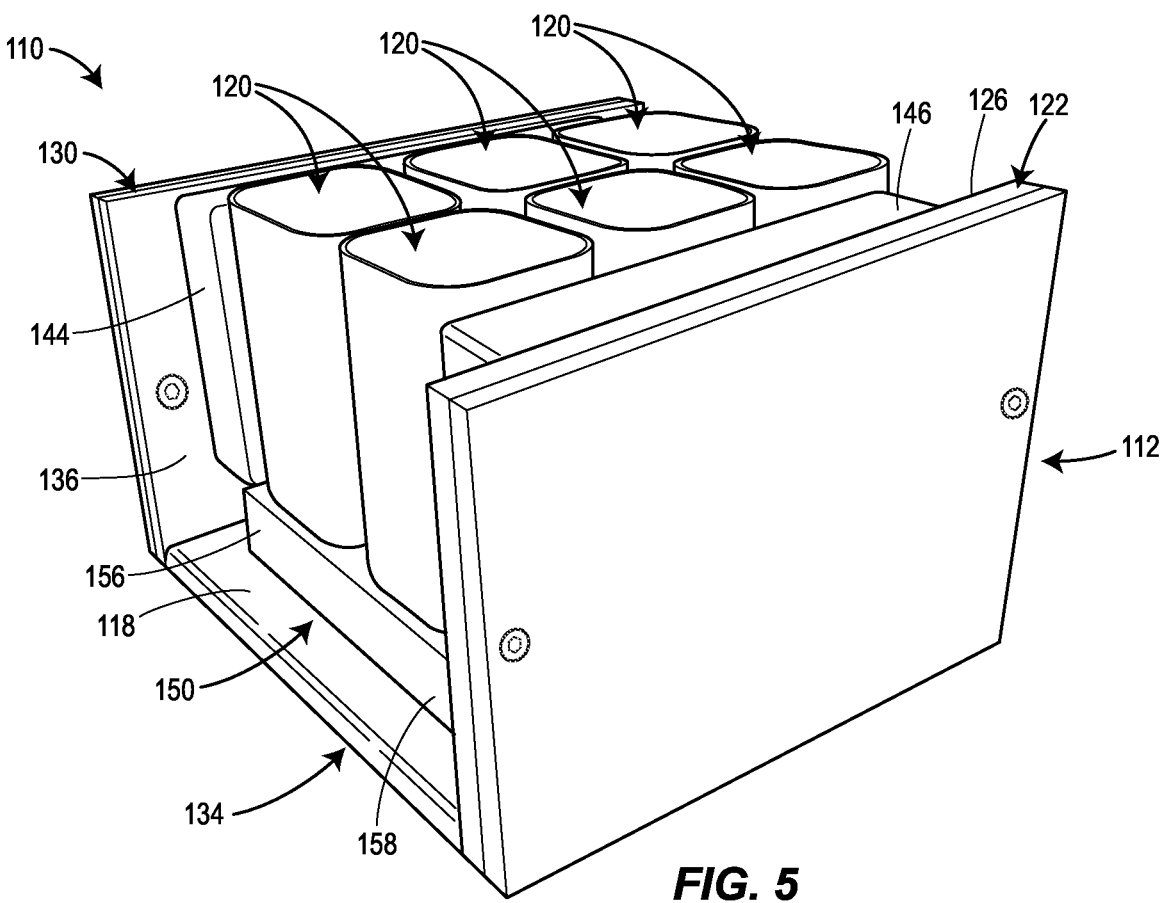
FIG. 5 is a perspective side view of another embodiment of a magnetic separator in accordance with principles of the present disclosure.

Turning to FIG. 5, illustrated is another embodiment of a magnetic separator 110 in accordance with principles of the present disclosure. The magnetic separator 110 is similar to the magnetic separator 10, except that it does not include beams extending between the vertical walls 130 and 132 of the frame 112. Elements of the magnetic separator 110 illustrated in FIG. 5 which are the same as or similar to those of the magnetic separator 10 illustrated in FIGS. 1-4 are designated by the same reference numeral, incremented by 100. A description of these similar components is omitted in the interest of brevity.

The absence of beams extending between the vertical walls 130 and 132 of the frame 112 results in the front opening 118, the top opening 126, and the rear opening 128 being continuous with each other. Accordingly, the space between the first and second magnetic field generating elements 114 and 116 may be more accessible to the user and there may be more than one insertion pathway for the non-magnetic support rack 150.

A method of using the magnetic separator 10 in a purification process will now be described with reference to FIGS. 6A-6G. FIGS. 6A-6G are schematic side views and omit various elements of the magnetic separator 10. The omission of these elements should not be understood to mean that they are necessarily missing from the magnetic separator 10. Also, the magnetic separator 110 may be used in a process similar to the one described in FIGS. 6A-6G.

Figure 6A:
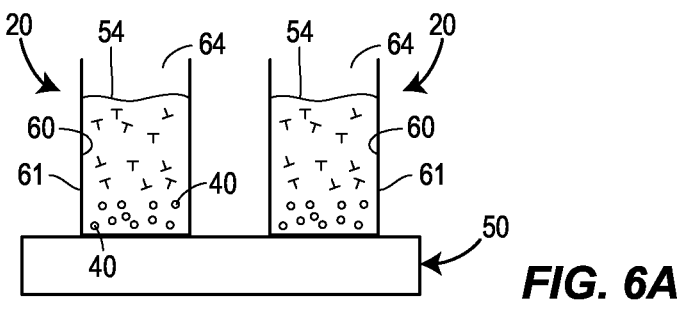
FIG. 6A-6G schematically illustrate, in chronological order, the steps of one embodiment of a purification method in accordance with principles of the present disclosure.
Figure 6B:
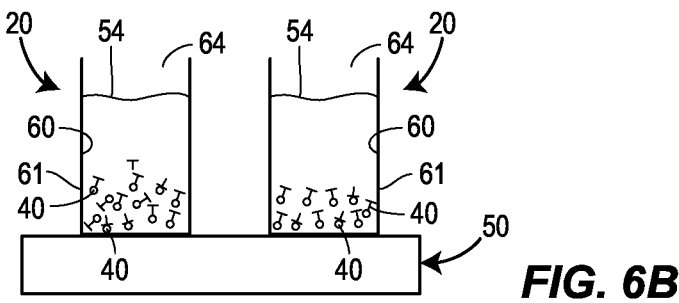

As an initial step, each of the containers 20, or a single one of the containers 20, may be filled with a volume of the medium 54 including the target substance T. Next, as shown in FIG. 6A, the magnetic beads 40 may be added to the containers 20 and left to interact with the medium 54 for a period of time (e.g., minutes, an hour, several hours, a day, several days, etc.). During this incubation period, the magnetic beads 40 may bind to the target substance T, thereby separating the target substance T from a remainder of the medium 54 (see FIG. 6B). As mentioned previously, the binding action between the magnetic beads 40 and the target substance T may achieved covalently, non-covalently, electrostatically, through hydrogen bonding, through van der Waals forces, and/or through any other suitable molecular binding process. In some embodiments, the medium 54 may be stirred or agitated during the incubation period to promote binding between the target substance T and the magnetic beads 40. Furthermore, in some embodiments, the containers 20 may be placed in the magnetic separator 10 during the time period while the magnetic beads 40 bind with the target substance T.

Figure 6C:
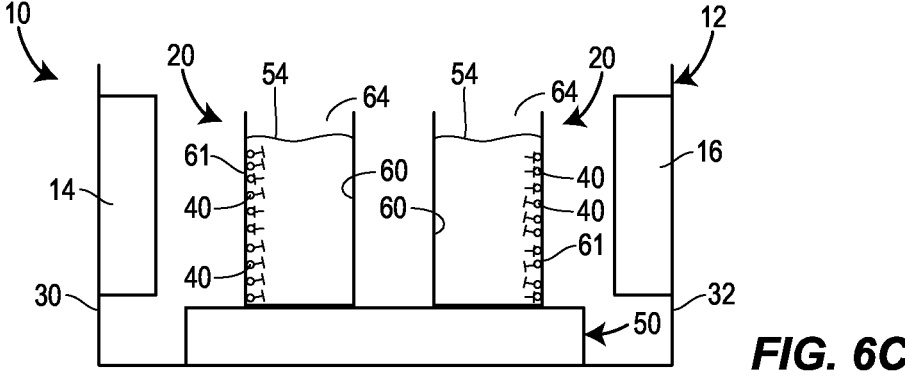

Next, if it has not been done already, the containers 20 may be secured to the non-magnetic support rack 50, and the non-magnetic support rack 50 may be inserted into the frame 12 between the first and second vertical sidewalls 30 and 32 such that the containers 20 are positioned between the first and second magnetic field generating elements 14 and 16, as shown in FIG. 6C. This step may require a user to manually move the non-magnetic support rack 50, with the containers 20 disposed thereon, from a first position located outside of the frame 12 to a second position located within the frame 12 between the first and second vertical sidewalls 30 and 32. In some embodiments, this motion may involve inserting the non-magnetic support rack 50 and the containers 20 through the front opening 18 of the frame 12 in a horizontal direction. In some embodiments, the first and second lateral ends 56 and 58 of the non-magnetic support rack 50 may slide or otherwise fit beneath the first and second magnetic field generating elements 14 and 16 during the insertion. In alternative embodiments, the non-magnetic support rack 50 and the containers 20 may be inserted through the top opening 26 in a vertically downward direction, or through the rear opening 28 in a horizontal direction.

As shown in FIG. 6C, when the containers 20 are positioned between the first and second vertical sidewalls 30 and 32, the proximity of the first and second magnetic field generating elements 14 and 16 may allow them to magnetically attract and hold the magnetic beads 40 against the interior surface 60 of a sidewall 61 of their respective containers 20. Friction between the magnetic beads 40 and the interior surface 60 of the container 20 may effectively immobilize or secure the magnetic beads 40 relative to the container 20, such that the magnetic beads 40 are inhibited or prevented from moving during subsequent steps of fluid removal and addition.

Figure 6D:
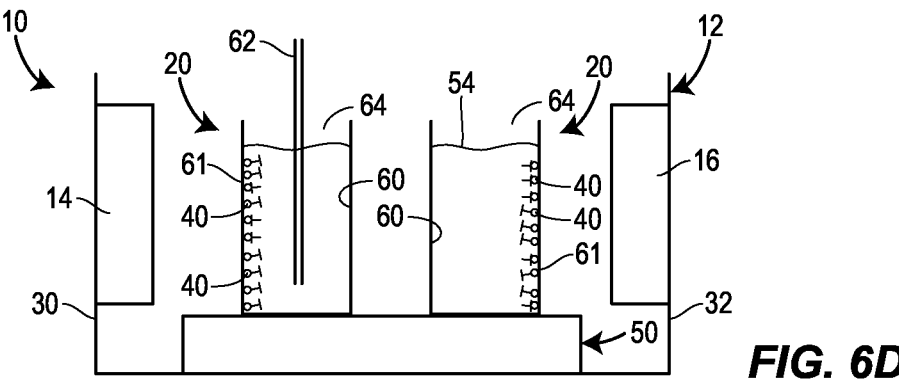

Next, as shown in FIG. 6D, the purification method may involve aspirating or removing the medium 54 from the container 20 via a fluid transfer member 62 such as, for example, a pipette or other fluid conduit. A distal end or mouth of a fluid transfer member 62 may be inserted through the top opening in the frame 12, and then into an opening 64 formed in the top of one of the containers 20, such that it is submerged in the medium 54. The mouth of the fluid transfer member 62 may be positioned adjacent or otherwise very close to a bottom wall 66 of the container 20 such that the fluid transfer member 62 can aspirate all or substantially all of the medium 54 in the container 20. The magnetic beads 40 are not removed at this step, because they are retained against the interior surface 60 of the sidewall 61 of the container 20 by the magnetic pull of the first magnetic field generating element 14 and/or second magnetic field generating element 16. Furthermore, the target substance T, which is bound to the magnetic beads 40, is also left behind in the container 20. This step of removing the medium 54 stripped of the target substance T may be repeated for all of the containers 20, or in some embodiments, performed simultaneously on all of the containers 20 with multiple fluid transfer members.

Figure 6E:
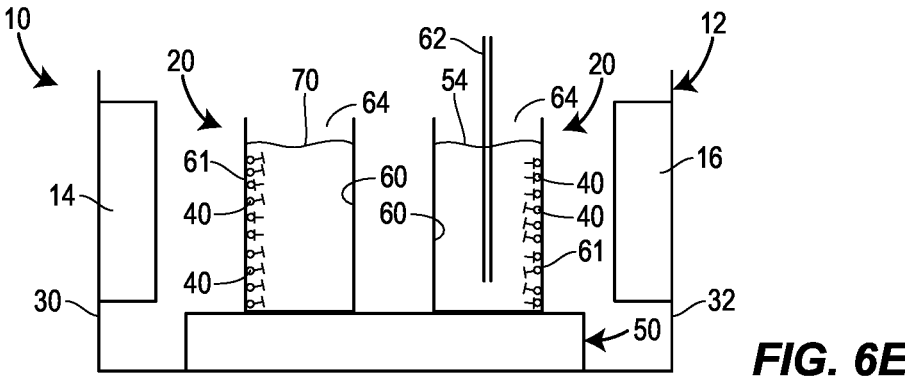

After removal of the medium 54, a washing fluid 70 (e.g., a salt solution) may be added to the container(s) 20 via the fluid transfer member 62 or another fluid conduit to clean the interior surface 60 of the container 20 and/or the magnetic beads 40 of any residual medium 54, as shown in FIG. 6E. However, the washing fluid 70 may not remove the target substance T from the magnetic beads 40. The volume of the washing fluid 70 added to the container(s) 20 may be equal to or less than (e.g., a fraction of) the maximum volume of the respective container 20. Optionally, immediately before or immediately after adding the washing fluid 70 to the container 20, the container 20 or the entire rack of containers 20 may be removed from the frame 12 such that the container(s) 20 are not positioned between the first and second magnetic field generating elements 14 and 16. In the absence of the relatively strong magnetic field of the magnetic field generating elements 14 and 16, the magnetic beads 40 may be free to disperse in the washing fluid 60 and may become suspended in the washing fluid 60. Allowing the magnetic beads 40 to disperse in this manner may increase the efficacy of the washing process and/or allow stirring or other agitation of the magnetic beads 40 in the washing fluid 70. After washing is complete, the washing fluid 70 may be removed from the container(s) 20 via the fluid transfer member 62 or other fluid conduit.

In alternative embodiments, one or more, or all of, above-described washing fluid related steps may be omitted.

Figure 6F:
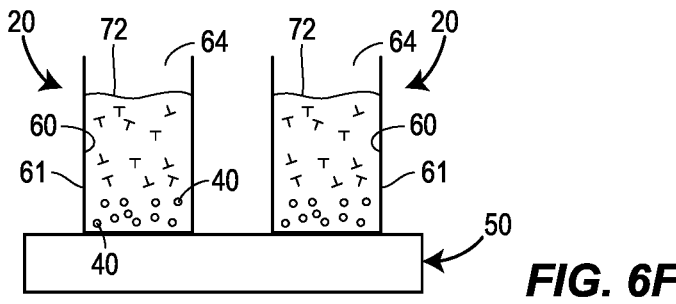
Figure 6G:
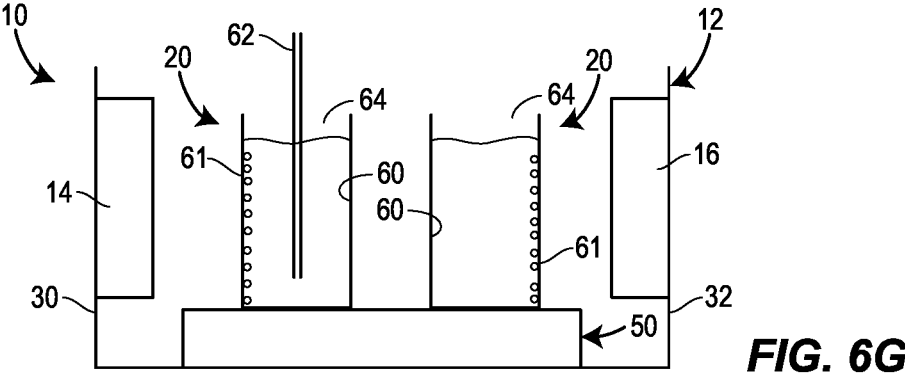

Next, as shown in FIG. 6F, an eluent 72 (e.g., a liquid elution solution) may be added to the container(s) 20 via the fluid transfer member 62 or another fluid conduit to cause the target substance T to release from the magnetic beads 40. If it has not been done already, immediately before or immediately after adding the eluent 72 to the container(s) 20, the container(s) 20 the container 20 or the entire rack of containers 20 may be removed from the frame 12 such that the container(s) 20 are not positioned between the first and second magnetic field generating elements 14 and 16. In the absence of the relatively powerful magnetic field of the magnetic field generating 14 and 16, the magnetic beads 40 may be free to disperse in the eluent 72 and may become suspended in the eluent 72. Allowing the magnetic beads 40 to disperse in this manner may increase the efficacy of the elution process and/or allow stirring or other agitation of the magnetic beads 40 in the eluent 72. Optionally, this elution step may be performed while the container(s) 20 are positioned between the first and second magnetic field generating elements 14 and 16.

After a period of incubation, the eluent 72 and the target substance T bound to the eluent 72 may be removed from the container(s) 20 via the fluid transfer member 62 or another conduit, and subsequently discharged to an external container(s). If it has not been done already, immediately prior to this fluid removal step, the container(s) 20 may be repositioned between the first and second magnetic field generating elements 14 and 16 such that the magnetic beads 40 are immobilized against the interior surface 60 of their respective container(s) 20. The above-described steps may then be repeated for another container or batch of containers containing another medium or mixture requiring purification.

It is noted that any of the foregoing steps of positioning the container(s) 20 between the first and second magnetic field generating elements 14 and 16 and/or removing the container(s) 20 from between the first and second magnetic field generating elements 14 and 16 may be performed manually by a user such as a laboratory technician. Also, the user may manually perform any of the fluid addition or removal steps with the assistance of, for example, a pipette. Furthermore, it is noted that the magnetic separator 10 may be dimensioned otherwise constructed such that it can be supported on a variety of standard lab benches and/or tabletops.

Figure 7:
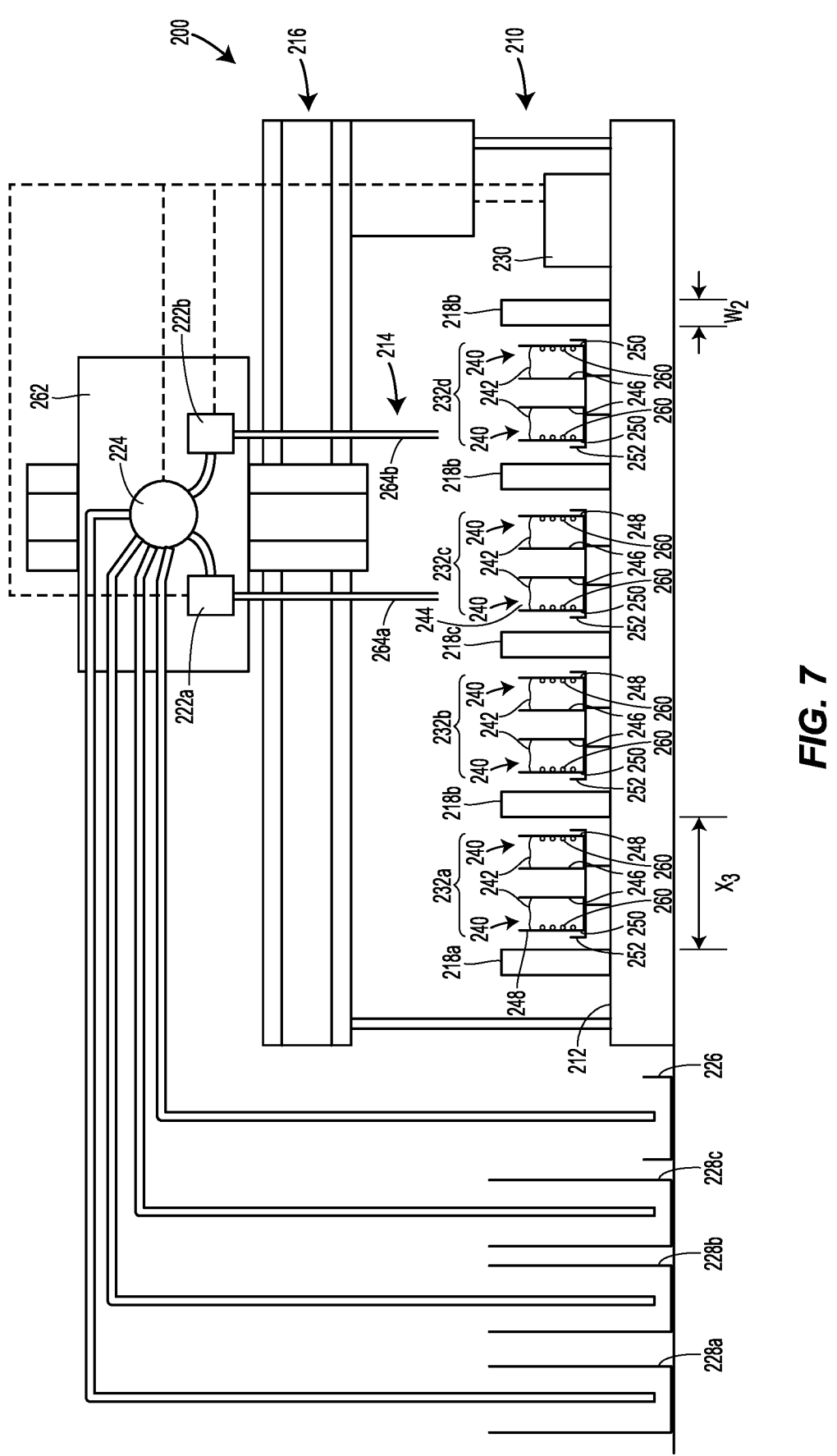
FIG. 7 is a front plan view of a schematic representation of an embodiment of a workstation for magnetic separation in accordance with principles of the present disclosure.
Figure 8:
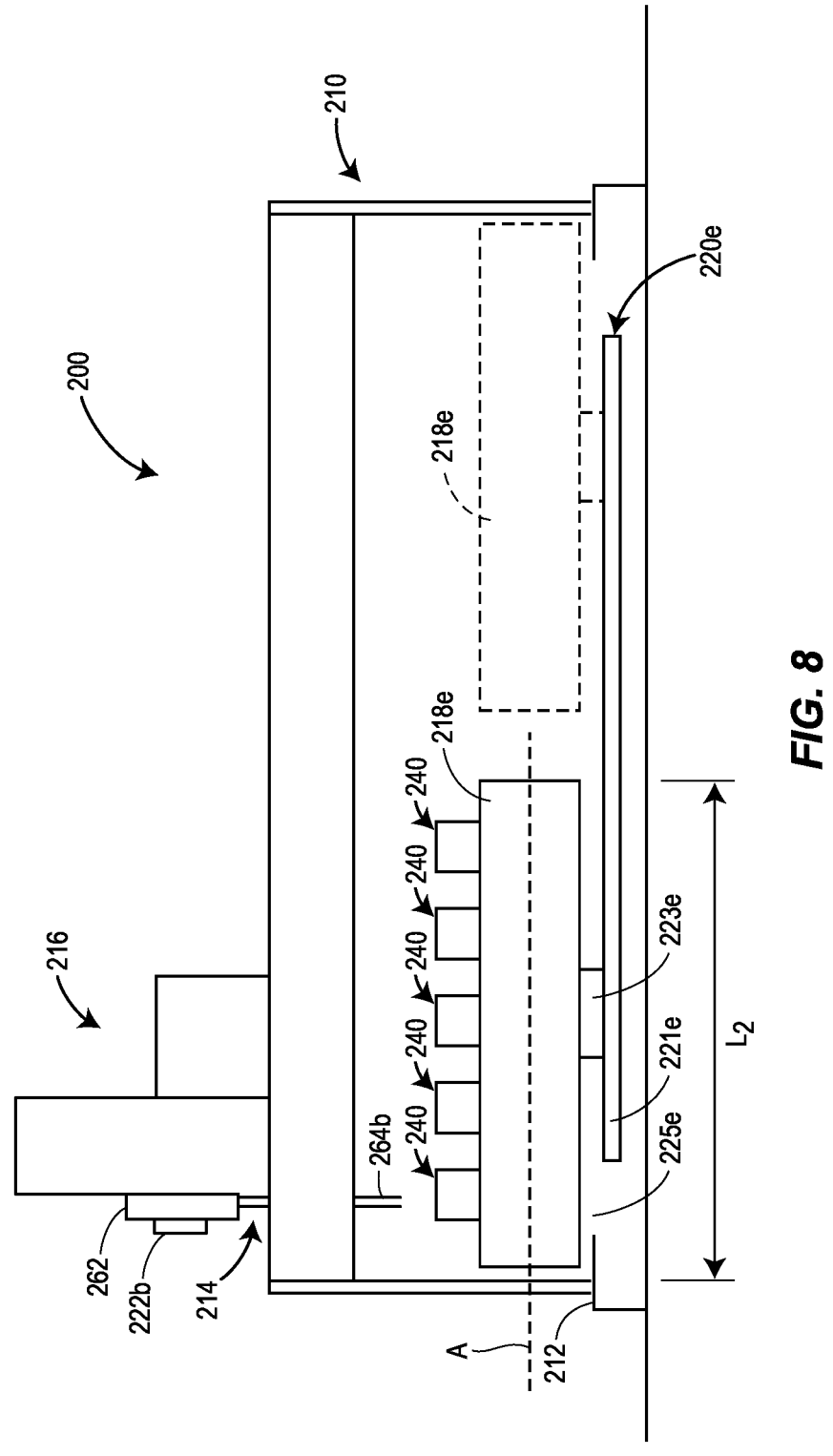
FIG. 8 is a side plan view of the schematic representation of the workstation shown in FIG. 7.

Turning to FIGS. 7 and 8, illustrated is a schematic representation of a workstation 200 for separating a target substance from a medium in which the target substance is suspended, in accordance with principles of the present disclosure. The workstation 200 is similar in some respects to the magnetic separator embodiments described above in that one or magnetic field generating elements are used to immobilize magnetic beads submerged in the medium and bound with the target substance, during fluid removal steps such as, for example, the removal of the medium, the removal of a washing fluid, and/or the removal of an elution fluid. However, the workstation 200 differs from the foregoing embodiments of the magnetic separator in that the one or more magnetic field generating elements are moved between various positions during the purification process while the container(s) remain stationary. Furthermore, unlike the magnetic separators described above, the workstation 200 incorporates an automated manipulator configured to move at least one fluid transfer member relative to the containers for fluid removal and/or addition purposes.

In general, the workstation 200 may be dimensioned or otherwise constructed such that it can be supported on a variety of standard lab benches and/or tabletops. Referring to the FIGS. 7-9, the workstation 200 may generally include a frame 210 including a horizontally arranged and upwardly facing work surface 212, a fluid transfer member 214, an automated manipulator 216, and one or more magnetic field generating elements 218a-e. Optionally, the workstation 200 may include one or more linear actuators 220a-e connected to the one or more magnetic field generating elements 218a-e, one or more pumps 222a-b in fluid communication with the fluid transfer member 214, a multi-position valve 224 in fluid communication with the one or more pump 222a-b, a waste container or drain 226, one or more auxiliary containers 228a-c containing one or more eluents, washing fluids, and/or other fluids, and/or a control unit 230.

As shown in FIG. 7, the magnetic field generating elements 218a-e may be laterally spaced apart from each other in a horizontal direction at regular intervals to define a plurality of rows 232a-d for slidably receiving a plurality of containers 240. In some embodiments, a lateral distance X3 separating adjacent ones of the magnetic field generating elements 218a-e may be in a range between approximately (e.g., ±10%) 3-10 inches, or in a range between approximately (e.g., ±10%) 3-8 inches, or in a range between approximately (e.g., ±10%) 3-6 inches, or in a range between approximately (e.g., ±10%) 3-5 inches, or greater than or equal to approximately (e.g., ±10%) 1 inch, or greater than or equal to approximately (e.g., ±10%) 2 inches, or greater than or equal to approximately (e.g., ±10%) 3 inches, or greater than or equal to approximately (e.g., ±10%) 4 inches, or equal to approximately (e.g., ±10%) 3.4 inches.

Each of the containers 240 may initially be filled with a medium 242 in which a target substance T is suspended. Each of the containers 240 may have an opening 244 formed its top, an interior surface 246, a sidewall 248, and a bottom wall 250 connected to the sidewall 248. The medium 242 and the target substance T may be similar to those discussed above. Within each of the rows 232a-d, the containers 240 may be held by a non-magnetic support rack 252, which in some embodiments, may be configured in a similar manner as the non-magnetic support rack discussed above.

A plurality of magnetic beads 260 may be submerged in the medium 242 in each of the containers 240. The magnetic beads 260 may be constructed in a similar manner as the beads 40 discussed above, and may be configured to bind to the target substance T suspended in the medium 242.

Each of the magnetic field generating elements 218a-e may extend lengthwise along a longitudinal axis A (see FIG. 8). Furthermore, in some embodiments, the longitudinal axes A of the magnetic field generating elements 218a-e may be parallel to each other. A length L2 of each of the magnetic field generating elements 218a-e may be parallel to the longitudinal axis A of the respective magnetic field generating element, and a width W2 of the magnetic field generating elements 218a-e may be perpendicular to the longitudinal axis A of the respective magnetic field generating element. In some embodiments, the length L2 may be within a range of approximately (e.g., ±10%) 10-48 inches, or within a range of approximately (e.g., ±10%) 10-36 inches, or within a range of approximately (e.g., ±10%) 10-30 inches, within a range of approximately (e.g., ±10%) 10-24 inches, or equal to or greater than approximately (e.g., ±10%) 10 inches, or equal to or greater than approximately (e.g., ±10%) 20 inches, or equal to or greater than approximately (e.g., ±10%) 30 inches. In some embodiments, the width W2 may be within a range of approximately (e.g., ±10%) 0.5-6 inches, or within a range of approximately (e.g., ±10%) 0.5-4 inches, or within a range of approximately (e.g., ±10%) 0.5-3 inches, or within a range of approximately (e.g., ±10%) 0.5-2 inches, or equal to or greater than approximately (e.g., ±10%) 0.5 inches, or equal to or greater than approximately (e.g., ±10%) 1 inch, or equal to or greater than approximately (e.g., ±10%) 1.5 inches, or equal to or greater than approximately (e.g., ±10%) 2 inches, or equal to or greater than approximately (e.g., ±10%) 2.5 inches.

Each of the magnetic field generating elements 218a-e may be moveable relative to the work surface 212 back-and-forth between a first or non-working position remote from its respective row of the containers 240 and a second or working position adjacent (e.g., immediately adjacent) to its respective row of containers 240. FIG. 8 schematically illustrates one of the magnetic field generating elements 218a-e in solid lines occupying its working position. FIG. 8 also illustrates, in dotted lines, the non-working position of this one of the magnetic field generating elements 218a-e. In the present embodiment, the workstation 200 includes a plurality of linear actuators 220a-e each being configured to independently reciprocate a respective one of the magnetic field generating elements 218a-e back-and-forth in a linear horizontal direction between its working and non-working positions. In other embodiments, a single linear actuator may be used to jointly move all of the magnetic field generating elements 218a-e simultaneously back-and-forth between their working and non-working positions. Each of the linear actuators 220a-e may include at least one of hydraulic cylinder, a pneumatic cylinder, or an electric motor. In embodiments including a hydraulic or pneumatic cylinder, a reciprocating piston may connect the hydraulic or pneumatic cylinder to its respective one of the magnetic field generating elements 218a-e. In embodiments where a rotating electric motor is included, a rack-and-pinion arrangement , pulley, or gear system may be used to convert the rotational motion output generated by the electric motor into linear motion of the respective one of the magnetic field generating elements 218a-e.

In the embodiment shown in FIG. 8, each of the linear actuators 220a-e takes the form of a pneumatic linear slide. As such, each of the linear actuators 220a-e may include a pneumatic cylinder 221a-e for receiving a pressurized gas, and piston or carrier element 223a-e that is translated back-and-forth by pressurizing different ends of the pneumatic cylinder 221a-e. As shown in FIG. 8, each of the pneumatic cylinders 221a-e may be disposed within an interior space of the frame 210 vertically below the work surface 212. Each of the carrier elements 223a-e may be mechanically connected to a respective one of the magnetic field generating elements 218a-e through a respective opening 225a-e formed in the work surface 212. Although FIG. 8 illustrates only the linear actuator 220e and its connection to the magnetic field generating element 218e, the other magnetic field elements 218a-d and linear actuators 220a-d may be configured in a similar manner, and are not illustrated for the purposes of conciseness. In alternative embodiments, the linear actuator 220e may be configured to move all of the magnetic field generating elements 218a-e together jointly.

While the magnetic field generating elements 218a-e of the present embodiment are movable in a horizontal direction that is parallel to the work surface 212, in alternative embodiments, each of the magnetic field generating elements 218a-e may be moveable in a vertical direction that is perpendicular or otherwise non-parallel to the work surface 212. In such alternative embodiments, a plurality of openings may be formed in the work surface 212, and each of the magnetic field generating elements 218a-e may be configured to reciprocally retract within and extend from a respective one of these openings. Here, the retracted position (which may be below the work surface 212) may correspond to the non-working position, and the extended position (which may be above the work surface 212) may correspond to the working position.

Figure 9:
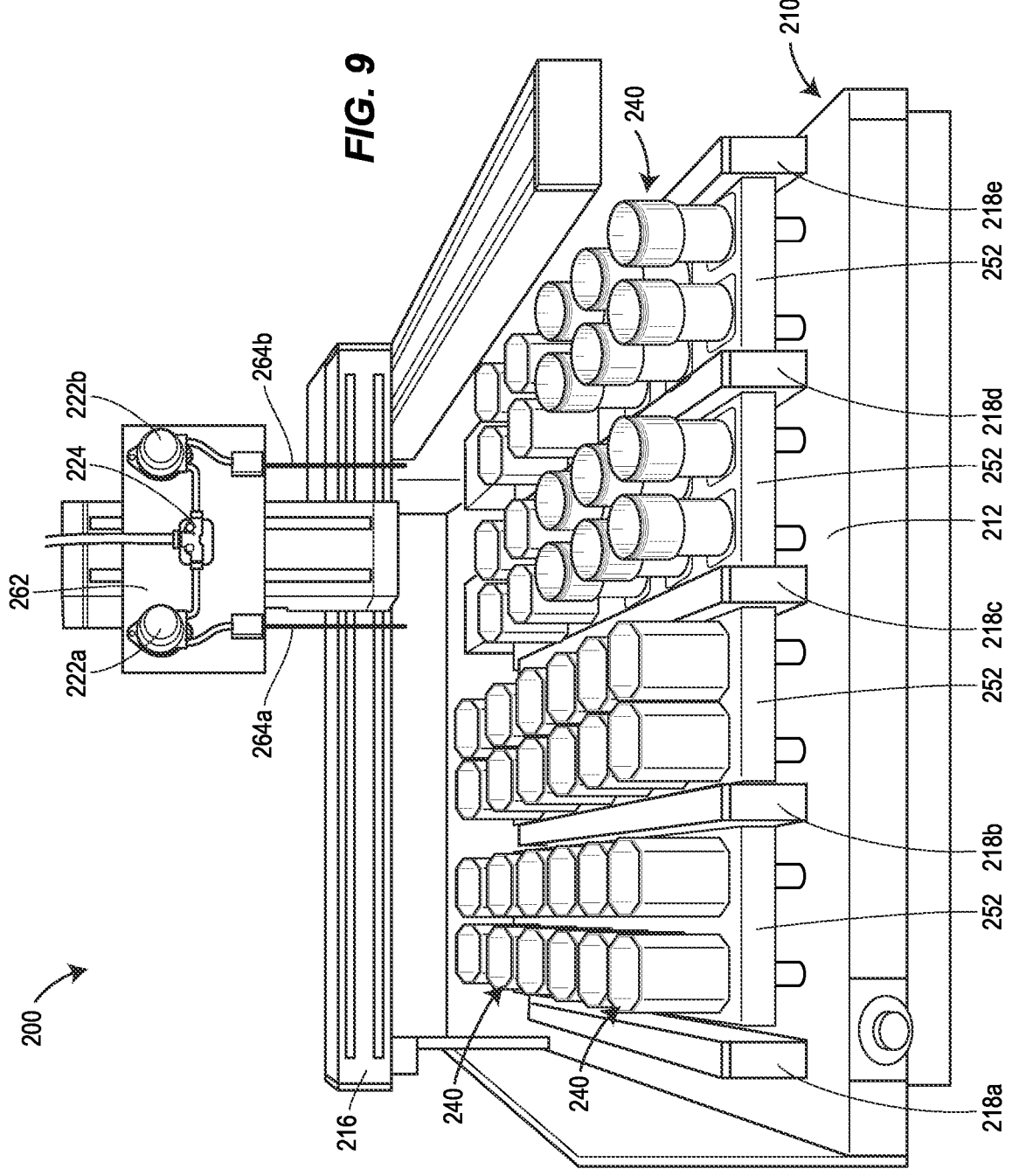
FIG. 9 is a front perspective view of an embodiment of a workstation in accordance with principles of the present disclosure.

In some embodiments, such as the one illustrated in FIG. 9, the linear actuators 220a-e may be omitted. In such embodiments, movement of the magnetic field generating elements 218a-e may be achieved by a user manually moving each of the magnetic field generating elements 218a-e, in a horizontal and/or vertical direction, between its working and non-working positions.

When the magnetic field generating elements 218a-e occupy their respective working positions, they may magnetically attract and hold the magnetic beads 260 against the interior surface 246 of the sidewall 248 of the containers 240. Friction between the magnetic beads 260 and the interior surface 246 of the containers 240 may effectively immobilize or secure the magnetic beads 260 relative to their respective one of the containers 240, such that the magnetic beads 260 are inhibited or prevented from moving during subsequent steps fluid removal and/or addition.

In some embodiments, each of the magnetic field generating elements 218a-e may be constructed of a respective permanent magnet configured to generate its own persistent magnetic field. Each of the permanent magnets may have a maximum magnetic pull force in range between approximately (e.g., ±10%) 50-1000 Newtons (N), or in a range between approximately (e.g., ±10%) 100-800 N, or in a range between approximately (e.g., ±10%) 100-700 N, or in a range between approximately (e.g., ±10%) 150-600 N, or in a range between approximately (e.g., ±10%) 200-500 N, or in a range between approximately (e.g., ±10%) 200-450 N, or in a range between approximately (e.g., ±10%) 250-350 N, or greater than or equal to approximately (e.g., ±10%) 50 N, or greater than or equal to approximately (e.g., ±10%) 100 N, or greater than or equal to approximately (e.g., ±10%) 150 N, or greater than or equal to approximately (e.g., ±10%) 200 N, or greater than or equal to approximately (e.g., ±10%) 250 N, or equal to approximately (e.g., ±10%) 289 N. In some embodiments, the total combined magnetic pull force of the permanents magnets may be greater than or equal to approximately (e.g., ±10%) 500 N, or greater than or equal to approximately (e.g., ±10%) 1000 N, or greater than or equal to approximately (e.g., ±10%) 1500 N, or greater than or equal to approximately (e.g., ±10%) 2000 N, or greater than or equal to approximately (e.g., ±10%) 2500 N, or greater than or equal to approximately (e.g., ±10%) 5000 N, or greater than or equal to approximately (e.g., ±10%) 7000 N, or greater than or equal to approximately (e.g., ±10%) 7500 N, or equal to approximately (e.g., ±10%) 7225 N. In some embodiments, the permanent magnets constituting the magnetic field generating elements 218a-e may be nickel-plated neodymium block magnets. In alternative embodiments, each of the magnetic field generating elements 218a-e may constructed of a respective electromagnet configured to generate a magnetic field when supplied with electric current.

With continued reference to FIGS. 7-9, the automated manipulator 216 may be configured to automatically move the fluid transfer member 214 relative to the work surface 212 among various positions, which may or may not be pre-defined or pre-programmed. The automated manipulator 216 may include one or more electric motors which are controlled by the control unit 230. In the illustrated embodiment, the automated manipulator 216 takes the form of a Cartesian coordinate robot which is moveable independently in each of an x-direction, a y-direction, and a z-direction. In the present embodiments, the x- and y-directions are horizontal linear directions, whereas the z-direction is a vertical linear direction. The automated manipulator 216 may include a separate electric motor and a separate track member for achieving each direction of movement. In other embodiments, the automated manipulator 216 may be capable of motion in only two directions (e.g., only the x- and y-directions, or only the x-and z-directions, or only the y- and z-direction) or in only a single linear direction. In still further embodiments, the automated manipulator 216 may take the form of a robotic arm capable of complex curved, linear, and/or rotational motions.

Referring still to FIGS. 7-9, the automated manipulator 216 may include a mounting plate 262 for mounting the fluid transfer member 214, the pumps 222*a-b*, the multi-position valve 224, and/or other components to be carried by the automated manipulator 216. The fluid transfer member 214 may be mechanically connected (e.g., fastened with a fastener) to the mounting plate 262 and extend downwardly in the vertical direction from the mounting plate 262. In the present embodiment, the fluid transfer member 214 includes two parallel vertical fluid conduits 264*a* and 264*b* (e.g., flexible or rigid plastic tubes) which are spaced apart from each other by a horizontal distance. The fluid conduit 264*a* may be in fluid communication with the pump 222*a*, and the fluid conduit 264*b* may be in fluid communication with the pump 222*b*. The horizontal distance separating the two fluid conduits 264*a* and 264*b* may be equal the horizontal distance separating the centers of any two adjacent ones of the rows 232*a-d*. Furthermore, in some embodiments, the horizontal distance separating the two fluid conduits 264*a* and 264*b* may be adjustable to account for containers 240 of different sizes. In alternative embodiments, the fluid transfer member 214 may include only a single vertical fluid conduit, or three or more vertical fluid conduits.

In general, each of the pumps 222*a-b* may be configured to remove and/or add fluids to a respective one of the containers 240 via the fluid transfer member 214. Each of the pumps 222*a-b* may be powered by any suitable means including, but not limited to, an electric motor and/or a source of pressurized hydraulic fluid and/or gas. Each of the pumps 222*a-b* may be operated at variable speeds or a single speed depending on the specifications of the purification process. In some embodiments, the operation of one or more of the pumps 222*a-b* may be electronically controlled by the control unit 230 according to, for example, programmable instructions stored in a memory of the control unit 230. Alternatively, or additionally, each of the pumps 222*a-b* may be operated by a user (e.g., a laboratory technician) who manually actuates an ON/OFF switch and/or rotates a speed knob. In some embodiments, such as on the one embodiment depicted in FIG. 9, one or more of the pumps 222*a-b* may be configured as a positive displacement pump such as a peristaltic pump and capable of pumping a fluid containing suspended solids (e.g., the magnetic beads 260) without causing damage to these solids. In alternative embodiments, one or more of the pumps 222*a-b* may be a centrifugal pump, such as a radial flow pump, which employs a rotating impeller to create a vacuum in order to move fluid. Furthermore, in some embodiments, each of the pumps 222*a-b* may be reversible.

The multi-position valve 224 may be configured to selectively fluidly connect to the pump 222*a* and/or the pump 222*b* to one or more of the auxiliary containers 228*a-c*, the drain 226, and/or other elements. Depending on the number of auxiliary containers, drains, etc., the multi-position valve 224 may be a 3-way valve, 4-way valve, 5-way valve, 6-way valve, 7-way valve, 8-way valve, or any other valve with any number selectively openable orifices. In some embodiments, operation of the multi-position valve 224 may be electronically controlled by the control unit 230 according to, for example, programmable instructions stored in a memory of the control unit 230. The multi-position valve 224 may incorporate one or more solenoids for opening and closing orifices of the multi-position valve 224 in response to command signals from the control unit 230.

In general, the control unit 230 may be electrically connected to at least the automated manipulator 216, the pumps 222*a-b*, and the linear actuators 220*a-e* (if included) such that the control unit 230 can send and/or receive electric control signals to and/or from these components. The control unit 230 may include a processor (e.g., a microprocessor), a memory (e.g., a random access memory (RAM), a non-volatile memory such as a hard disk executable by the processor, a flash memory, a removable memory, a non-removable memory, etc.) for storing tangible, non-transitory computer-readable instructions, a communication unit, a display, and an input device (e.g., keyboard, keypad, touchscreen, etc.). In some embodiments, the control unit 230 may be a programmable logic controller. The control unit 230 may be programmed to execute a purification process according to a user's pre-defined specifications. In some embodiments, the control unit 230 may execute steps of the purification process, such as activating the automated manipulator 216 to move the fluid transfer member 214 and/or activating one or more of the linear actuators 220*a-e* to move one or more of the magnetic field generating elements 218*a-e*, in response to sensor data received from one or more sensors included in, or used in conjunction with, the workstation 200 and representative of a characteristic of the medium 242 and/or target substance T (e.g., the volume, temperature, weight, pH, etc.), a timer, the operator's analog or digital input, and/or any other relevant detectable event or occurrence.

A method of using the workstation 200 in a purification process will now be described. As an initial step, each of the containers 240, or a single one of the containers 240, may be filled with a volume of the medium 242 including the target substance T. Next, the magnetic beads 260 may be added to the containers 240 and left to interact with the medium 242 for a period of time (e.g., minutes, an hour, several hours, a day, several days, etc.). During this incubation period, the magnetic beads 260 may bind to the target substance T, thereby separating the target substance T from a remainder of the medium 242 (similar to FIG. 6B). As mentioned previously, the binding action between the magnetic beads 260 and the target substance T may achieved covalently, non-covalently, electrostatically, through hydrogen bonding, through van der Waals forces, and/or through any other suitable molecular binding process. In some embodiments, the medium 242 may be stirred or agitated during the incubation period to promote binding between the target substance T and the magnetic beads 242.

Next, if it has not already been done, the containers 240 may be secured, in groups, to a plurality of non-magnetic support racks 252. Then, each of the loaded non-magnetic support racks 252 may be inserted horizontally between a respective pair of the magnetic field generating elements 218*a-e* on top of the work surface 212. In doing so, each the containers 240 may be arranged in one of the rows 232*a-d* defined between adjacent ones of the magnetic field generating elements 218*a-e*. This step may involve a user manually positioning each of the non-magnetic support racks 252 in a respective one of the rows 232*a-d*. This insertion step may be performed with each of the magnetic field generating elements 218*a-e* positioned in their respective working positions (see FIG. 9), or alternatively, with each of the magnetic field generating elements 218*a-e* positioned in their respective working positions. In the case of the later, the magnetic field generating elements 218*a-e* may be moved to their respective working positions after placement of the non-magnetic support racks 252 on the work surface 212.

The proximity of the magnetic field generating elements 218*a-e* may allow them to magnetically attract and hold the magnetic beads 260 against the interior surface 246 of the sidewall 248 of their respective containers 240. Friction between the magnetic beads 260 and the interior surface 246 of the container 240 may effectively immobilize or secure the magnetic beads 260 relative to the container 240, such that the magnetic beads 260 are inhibited or prevented from moving during subsequent steps of removing and adding fluids to the container 240.

Next, the purification method may involve aspirating or removing the medium 242 from the container 240 via the fluid transfer member 214. To do this, the control unit 230 may control the automatic manipulator 216 to horizontally move the fluid transfer member 214, e.g., in the x-direction and/or y-direction, until the fluid conduit 264*a* is arranged directly vertically above a first one of the containers 240 and the fluid conduit 264*b* is arranged directly vertically above a second one of the containers 240. Subsequently, the control unit 230 may control the automatic manipulator 216 to move the fluid transfer member 214 in the downward vertical direction (i.e., along the z-axis) such that the first fluid conduit 264*a* is inserted through the opening 244 in the top of the first one of the containers 240 and submerged in the medium 242 in that containers 240, and the second fluid conduit 264*b* is inserted through the opening 244 in the top of the second one of the containers 240 and submerged in the medium 242 contained in that container 240. This fluid transfer member 214 may be moved in the downward vertical direction by the automatic manipulator 216 until a mouth of the first fluid conduit 264*a* is adjacent or otherwise very close to a bottom wall 250 of the first one of the containers 240 and the second fluid conduit 264*b* is adjacent or otherwise very close to a bottom wall 250 of the second one of the containers 240. So configured, the first and second fluid conduits 264*a* and 264*b* may be able to aspirate all or substantially all of the medium 242 from their respective containers 240. The pumps 222*a* and 222*b* may be activated by the control unit 230 after proper positioning of the fluid transfer member 214 to create the suction needed to remove the medium 242 from the container 240. The magnetic beads 260 are not removed at this step, because they are held statically against the interior surface 246 of the sidewall 248 of the container 240 by the magnetic pull force of magnet field generating elements 218*a-e*. Also, during this aspiration step, the multi-position valve 224 may be controlled to fluidly connect each of the pumps 222*a* and 222*b* with the waste container or drain 226, such that the aspirated fluid is discharged there.

Once aspiration is complete, the control unit 230 may control the automatic manipulator 216 to move the fluid transfer member 214 upward in the vertical direction to remove the first and second fluid conduits 264*a* and 264*b* from their respective containers 240, and subsequently the process in the preceding paragraph may be repeated for the other containers 240 disposed on the work surface 212.

Next, a washing fluid (e.g., a salt solution) may be added to the containers 240 via the fluid transfer member 214 to clean the interior surfaces 246 of the containers 240 and/or the magnetic beads 260 of any residual medium 242, without removing the target substance T from the magnetic beads 260. Initially, similar to the medium removal step described above, the control unit 230 may control the automatic manipulator 216 to move the fluid transfer member 214 horizontally such that the fluid conduit 264*a* is arranged directly vertically above a first one of the containers 240 and the fluid conduit 264*b* is arranged directly vertically above a second one of the containers 240. Subsequently, the control unit 230 may control the automatic manipulator 216 to move the fluid transfer member 214 in the downward vertical direction (i.e., along the z-axis) such that the first fluid conduit 264*a* is inserted through the opening 244 in the top of the first one of the containers 240, and the second fluid conduit 264*b* is inserted through the opening 244 in the top of the second one of the containers 240. Simultaneously, or around the same time, the control unit 230 may control the multi-position valve 224 to fluidly connect each of the pumps 222*a* and 222*b* with one or more of the auxiliary containers 228*a-c* containing a washing fluid. Subsequently, the control unit 230 may activate the pumps 222*a* and 222*b* to suction the washing fluid from the one or more of the auxiliary containers 228*a-c* and transfer it to the containers 240 via the fluid transfer member 214.

Once the washing fluid has been added to the first and second ones of the containers 240, the control unit 230 may control the automatic manipulator 216 to move the fluid transfer member 214 upward in the vertical direction to remove the first and second fluid conduits 264*a* and 264*b* from their respective containers 240, and subsequently the process in the preceding paragraph may be repeated for the other containers 240 disposed on the work surface 212.

Optionally, immediately before or immediately after adding the washing fluid to the containers 240, the magnetic field generating elements 218*a-e* may be translated from their respective working positions adjacent the containers 240 to their respective non-working positions remote from the containers 240. In the absence of the relatively powerful magnetic field of the magnetic field generating elements 218*a-e*, the magnetic beads 260 may be free to disperse in the washing fluid, which may increase the efficacy of the washing process and/or allow stirring or other agitation of the magnetic beads 260 in the washing fluid. In some embodiments, moving the magnetic field generating elements 218*a-e* may be accomplished by the control unit 230 activating the linear actuators 220*a-e* such that the linear actuators 220*a-e* each translate a respective one of the magnetic field generating elements 218*a-e* from its respective working position to its respective non-working position.

After washing is complete, the control unit 230 may control the multi-position valve 224 to fluidly connect the pumps 222*a* and 222*b* to the waste container or drain 226, and also control the automatic manipulator 216 to move the fluid transfer member 214 between the various containers 240 while controlling the pumps 222*a* and 222*b* to suction the washing fluid from the containers 240 and eject the washing fluid to the drain 226. Prior to this washing fluid removal step, if it has not already been done, the magnetic field generating elements 218*a-e* may be translated from their respective non-working positions remote from the containers 240 to their respective working positions adjacent to the containers 240. As a result, the magnetic field of the magnetic field generating elements 218*a-e* may magnetically attract and hold the magnetic beads 260 statically against the interior surface 246 of the sidewall 248 of their respective containers 240, while the washing fluid is removed from the containers 240. The control unit 230 may be responsible for activating the linear actuators 220*a-e* to move the magnetic field generating elements 218*a-e* from their respective non-working positions to their respective working positions.

In alternative embodiments, one or more, or all of, above-described washing fluid related steps may be omitted.

Next, an eluent (e.g., a liquid elution solution) may be added to the containers 240 via the fluid transfer member 214 to cause the target substance T to release from the magnetic beads 260. As an initial step here, the control unit 230 may control the multi-position valve 224 to fluidly connect the pumps 222*a* and 222*b* to one or more of the auxiliary containers 228*a-c* containing an eluent fluid. Also, if it has not been done already, immediately before or immediately after adding the eluent to the containers 240, the magnetic field generating elements 218*a-e* may be translated from their respective working positions adjacent to the containers 240 to their respective non-working positions remote from the containers 240. This may be accomplished with the control unit 230 activating the linear actuators 220*a-e* to move the magnetic field generating elements 218*a-e* from their respective working positions to their respective non-working positions. The control unit 230 may then, similar to the washing fluid step described above, control the automatic manipulator 216 to move the fluid transfer member 214 horizontally such that the fluid conduit 264*a* is arranged directly vertically above a first one of the containers 240 and the fluid conduit 264*b* is arranged directly vertically above a second one of the containers 240. Subsequently, the control unit 230 may control the automatic manipulator 216 to move the fluid transfer member 214 in the downward vertical direction (i.e., along the z-axis) such that the first fluid conduit 264*a* is inserted through the opening 244 in the top of the first one of the containers 240, and the second fluid conduit 264*b* is inserted through the opening 244 in the top of the second one of the containers 240. Subsequently, the control unit 230 may activate the pumps 222*a* and 222*b* to suction the eluent fluid from the one or more of the auxiliary containers 228*a-c* and transfer it to the containers 240 via the fluid transfer member 214.

In the absence of the relatively powerful magnetic field of the magnetic field generating elements 218*a-e*, the magnetic beads 260 may be free to disperse in the eluent, which may increase the efficacy of the elution process and/or allow stirring or other agitation of the magnetic beads 260 in the eluent. The foregoing eluent addition process may be repeated for all of the containers 240. In alternative embodiments, this elution step may be performed with the magnetic field generating elements 218*a-e* disposed in their respective working positions.

After a period of incubation, the eluent and the target substance T may be removed from the containers 240 via the fluid transfer member 214, and subsequently discharged to an external container(s). As an initial step here, the control unit 230 may control the multi-position valve 224 to fluidly connect the pumps 222*a* and 222*b* to one or more of the auxiliary containers 228*a-c* for storing the eluent fluid mixed with the target substance T. Also, if it has not been done already, the magnetic field generating elements 218*a-e* may be translated from their respective non-working positions remote from the containers 240 to their respective working positions adjacent to the containers 240. This may be accomplished with the control unit 230 activating the linear actuators 220*a-e* to move the magnetic field generating elements 218*e-e* from their respective non-working positions to their respective working positions. As a result, the magnetic field of the magnetic field generating elements 218*e-e* may magnetically attract and hold the magnetic beads 260 statically against the interior surface 246 of the sidewall 248 of their respective containers 240. The control unit 230 may then, similar to the washing fluid step described above, control the automatic manipulator 216 to move the fluid transfer member 214 horizontally such that the fluid conduit 264*a* is arranged directly vertically above a first one of the containers 240 and the fluid conduit 264*b* is arranged directly vertically above a second one of the containers 240. Subsequently, the control unit 230 may control the automatic manipulator 216 to move the fluid transfer member 214 in the downward vertical direction (i.e., along the z-axis) such that the first fluid conduit 264*a* is inserted through the opening 244 in the top of the first one of the containers 240, and the second fluid conduit 264*b* is inserted through the opening 244 in the top of the second one of the containers 240. Subsequently, the control unit 230 may activate the pumps 222*a* and 222*b* to suction the eluent fluid mixed with the target substance T from the containers 240 and transfer it to one or more of the auxiliary containers 228*e-c*. The process of removing the eluent mixed with the target substance T may be repeated for all of the containers 240.

It is noted that any of the foregoing steps of moving the magnetic field generating elements to and from the working and/or non-working positions may be performed manually by a user such as a laboratory technician.

While the apparatuses, systems, and methods of the present disclosure have been described in connection with various embodiments, it will be understood that the apparatuses, systems, and methods of the present disclosure are capable of further modifications. This application is intended to cover any variations, uses, or adaptations of the apparatuses, systems, and methods following, in general, the principles of the present disclosure, and including such departures from the present disclosure as, within the known and customary practice within the art to which the invention pertains.

Furthermore, it is noted that the construction and arrangement of the disclosed magnetic separators and workstations, and their various components and assemblies, as shown in the various exemplary embodiments is illustrative only. Although only a few embodiments of the subject matter at issue have been described in detail in the present disclosure, those skilled in the art who review the present disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, and vice versa. Also, the position of elements may be reversed or otherwise varied, and the nature or number of discrete elements or positions may be altered or varied. Accordingly, all such modifications are intended to be included within the scope of the present disclosure as defined in the appended claims. Furthermore, the order or sequence of any process or method steps may be varied or re-sequenced according to alternative embodiments. Other substitutions, modifications, changes and omissions may be made in the design, operating conditions and arrangement of the various exemplary embodiments without departing from the scope of the present disclosure.

What is claimed is:

1. A purification method comprising:
   adding a medium in which a target substance is suspended to a container;

adding a plurality magnetic beads to the container, the target substance temporarily binding to the plurality of magnetic beads; and positioning the container between a first magnetic field generating element mounted on an inwardly facing surface of a first sidewall and a second magnetic field generating element mounted on an inwardly facing surface of a second sidewall, the first and second magnetic field generating elements being held at a distance from each other by a frame including the first sidewall, the second sidewall, and a bottom wall extending between the inwardly facing surface of the first sidewall and the inwardly facing surface of the second sidewall, the first magnetic field generating element comprising a first surface facing the first sidewall and a second surface configured to face the container, wherein the first surface and the second surface of the first magnetic field generating element face in opposite directions, and the second magnetic field generating element comprising a first surface facing the second sidewall and a second surface configured to face the container, wherein the first surface and the second surface of the second magnetic field generating element face in opposite directions, at least one of the first magnetic field generating element or the second magnetic field generating element magnetically attracting and holding the plurality of magnetic beads against an interior surface of the container.

2. The purification method of claim 1, wherein positioning the container between the first magnetic field generating element and the second magnetic field generating element comprises manually moving the container from a first position outside of the frame to a second position located between the first and second magnetic field generating elements.

3. The purification method of claim 1, comprising removing the medium from the container while at least one of the first magnetic field generating element or the second magnetic field generating element magnetically attracts and holds the plurality of magnetic beads against the interior surface of the container.

4. The purification method of claim 3, comprising, after removing the medium from the container, adding an eluent to the container to elute the target substance bound to the plurality of magnetic beads and removing the container from between the first and second magnetic field generating elements so that the plurality of magnetic beads are free to disperse in the eluent.

5. The purification method of claim 4, comprising repositioning the container between the first and second magnetic field generating elements such that at least one of the first magnetic field generating element or the second magnetic field generating element magnetically attracts and holds the plurality of magnetic beads against the interior surface of the container, and subsequently removing the eluent from the container.

6. The purification method of claim 3, comprising, after removing the medium from the container, adding a washing fluid to the container and removing the container from between the first and second magnetic field generating elements so that the plurality of magnetic beads are free to disperse in the washing fluid.

7. The purification method of claim 6, comprising repositioning the container between the first and second magnetic field generating elements such that at least one of the first magnetic field generating element or the second magnetic field generating element magnetically attracts and holds the plurality of magnetic beads against the interior surface of the container, and subsequently removing the washing fluid from the container.

8. The purification method of claim 1, wherein positioning the container between the first magnetic field generating element and the second magnetic field generating element comprises inserting the container in a horizontal direction through an opening defined between the first sidewall and the second sidewall.

9. The purification method of claim 1, the first magnetic field generating element including a first permanent magnet.

10. The purification method of claim 9, the first permanent magnet having a maximum magnetic pull force equal to or greater than 100 N.

11. A purification method comprising:

providing a workstation having a base including a work surface being horizontally arranged and an interior space vertically below the work surface, an automated manipulator moveable relative to the work surface and carrying a fluid transfer member, a plurality of magnetic field generating elements laterally spaced apart from each other to define a plurality of rows, and a linear actuator positioned at least partially within the interior space of the base at least partially vertically below the work surface;

adding at least one medium in which a target substance is suspended to a plurality of containers;

adding a plurality of magnetic beads to the plurality of containers, the target substance temporarily binding to the plurality of magnetic beads;

arranging the plurality of containers in the plurality of rows defined between the plurality of magnetic field generating elements, such that the plurality of magnetic field generating elements magnetically attract and hold the plurality of magnetic beads against an interior surface of a respective container of the plurality of containers; and moving, by motion generated by the linear actuator, at least a first magnetic field generating element of the plurality of magnetic field generating elements in a horizontal direction relative to the work surface.

12. The purification method of claim 11, comprising causing the automated manipulator to insert an end of the fluid transfer member into the at least one medium contained in at least a first container of the plurality of containers and removing the at least one medium from the first container via the fluid transfer member.

13. The purification method of claim 12, comprising after removing the medium from the first container, moving at least the first magnetic field generating element of the plurality of magnetic field generating elements from a first position adjacent to the first container to a second position remote from the first container.

14. The purification method of claim 13, comprising adding an eluent to the first container via the fluid transfer member to elute the target substance bound to the plurality of magnetic beads.

15. The purification method of claim 14, comprising moving the first magnetic field generating element from the second position to the first position, such that the first magnetic field generating element magnetically attracts and holds the plurality of magnetic beads against the interior surface of the first container, and subsequently removing the eluent from the first container via the fluid transfer member.

16. The purification method of claim 13, comprising adding a washing fluid to the first container via the fluid transfer member.

17. The purification method of claim 16, comprising moving the first magnetic field generating element from the second position to the first position, such that the first magnetic field generating element magnetically attracts and holds the plurality of magnetic beads against the interior surface of the first container, and removing the washing fluid from the first container via the fluid transfer member.

18. The purification method of claim 11, the plurality of magnetic field generating elements including a first permanent magnet.

19. The purification method of claim 18, the first permanent magnet having a maximum magnetic pull force equal to or greater than 100 N.

20. The purification method of claim 11, the automated manipulator including a Cartesian coordinate robot moveable in at least an x-direction and a y-direction.

* * * * *